United States Patent Office 3,275,108
Patented Sept. 27, 1966

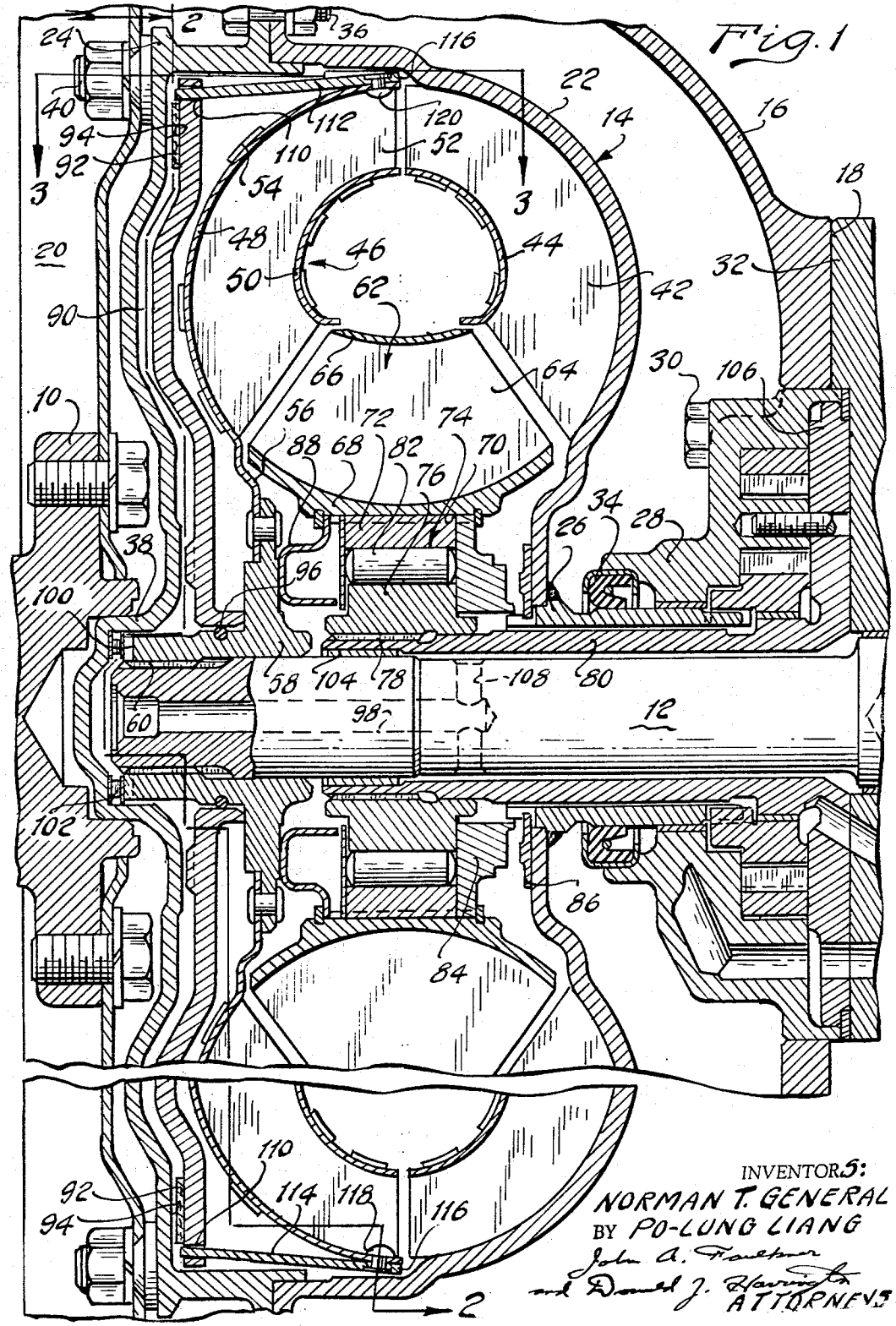

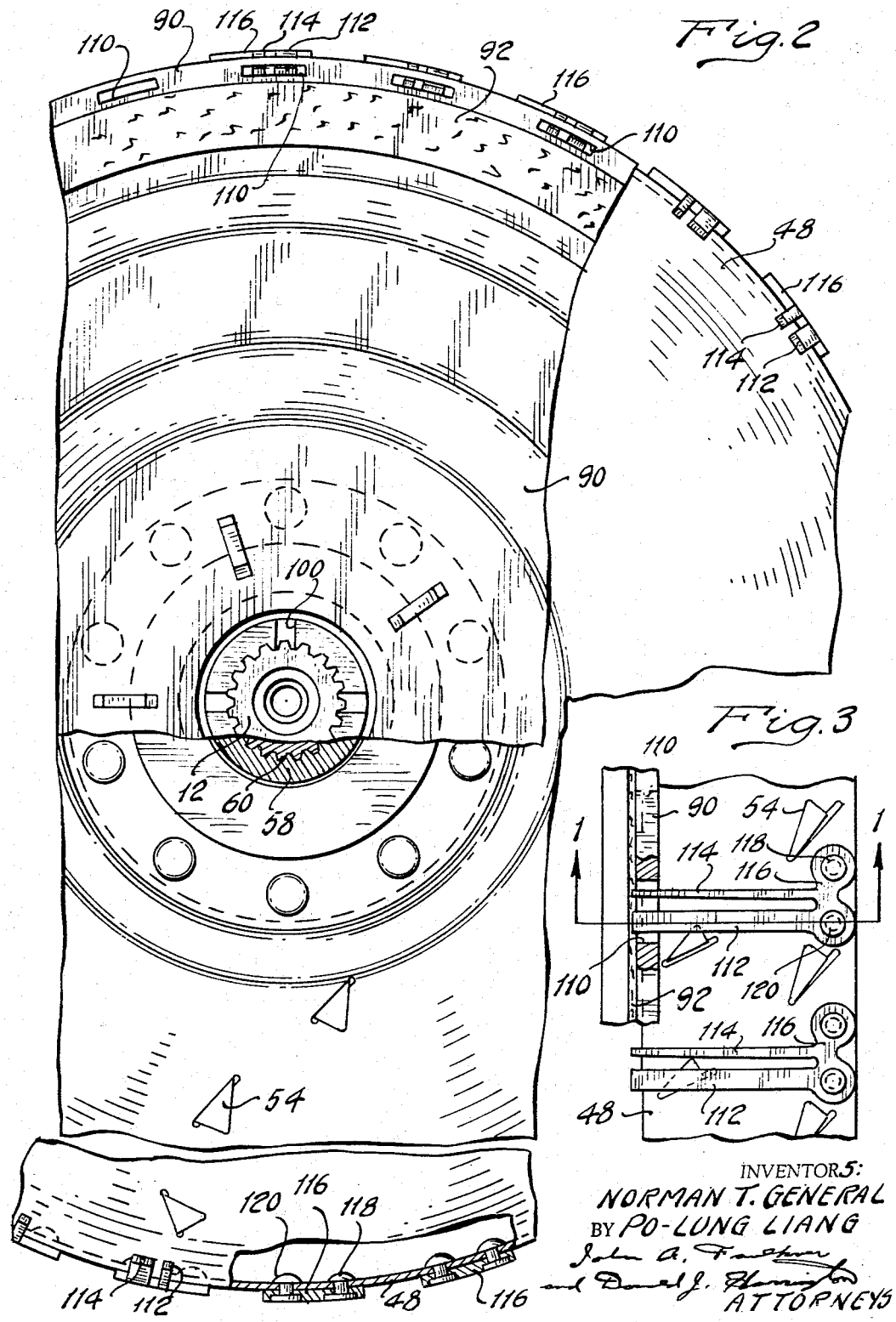

3,275,108
DAMPER FOR TORQUE CONVERTER LOCK-UP CLUTCH
Norman T. General, Farmington, and Po-Lung Liang, Lincoln Park, Mich., assignors to Ford Motor Company, Dearborn, Mich., a corporation of Delaware
Filed Oct. 23, 1964, Ser. No. 406,061
6 Claims. (Cl. 192—3.3)

Our invention relates generally to hydrokinetic power transmission mechanisms for use in a torque delivery driveline. More particularly, it relates to a hydrokinetic torque converter mechanism capable of transmitting torque hydrokinetically throughout a wide range of speed ratios wherein provision is made for bypassing the hydrokinetic members when the speed ratio approaches unity, the mechanism being adapted to operate thereafter with a 1:1 torque ratio. The direct drive condition is established by means of a friction clutch mechanism that connects together drivably the impeller member of the hydrokinetic unit with the turbine member.

We are aware of various converters with which lockup clutch structures are used. Unless provision is made in such structures for dampening and absorbing the inertia forces that accompany a transition from a hydrokinetic operating zone to a mechanical operating zone, an undesirable torque fluctuation in the driveline is experienced. In our improved system we have provided a means for dampening the torsional vibration forces and inertia forces during engagement of the lockup clutch.

The lockup clutch in the preferred embodiment disclosed herein includes a friction disc member situated within the interior of the impeller shell. It is adapted to be shifted axially under the influence of the pressure differential thereacross. Cooperating friction surfaces are formed on the radially outward portion of the impeller shell and on the disc member.

The turbine itself can be connected to the axially shiftable clutch member so that when the latter is brought into frictional driving engagement with the cooperating surface of the impeller shell, the ineria forces due to the lack of synchronism between the motion of the shell and the motion of the turbine will be absorbed.

The dampening structure associated with the lockup clutch mechanism is located wholly within the inner torus region of the shell. It requires no maintenance and may be calibrated to act as a suitable dampening means for any of a wide range of torques for which the hydrokinetic unit is calibrated.

The provision of a dampening means of the type above set forth being a principal object of our invention, it is a further object of our invention to provide a combined lockup clutch and damper assembly wherein cantilever spring members carried by the turbine of the hydrokinetic unit cooperate with rotary portions of the lockup clutch structure to define a resilient torque delivery path.

It is a further object of our invention to provide a mechanism of the type above set forth in the preceding objects wherein relative motion between the lockup clutch structure and the turbine itself is accompanied by mechanical friction between the cantilever structure and the associated movable portion of the lockup clutch.

It is a further object of our invention to provide a structure of the type above set forth wherein provision is made for limiting the maximum torque that may be transmitted mechanically through the cantilever structure to the driven portions of the mechanism.

Further objects and features of our invention will become apparent from the following description and from the accompanying drawings, wherein:

FIGURE 1 shows in longitudinal cross-sectional form a hydrokinetic torque converter mechanism embodying the improved clutch and damper construction of our invention;

FIGURE 2 is an end elevation view of the turbine mechanism of FIGURE 1 as viewed along the plane of section line 2—2 of FIGURE 1; and FIGURE 3 is an elevation view of the turbine of FIGURE 2 as viewed along the plane of section line 3—3 of FIGURE 2.

Referring first to FIGURE 1, numeral 10 designates a portion of the crankshaft of an internal combustion vehicle engine for an automotive vehicle driveline. Numeral 12 designates a turbine shaft which is connected to a power input gear element of a planetary gear system, the output element of which can be connected through a suitable driveline to the vehicle traction wheels.

A hydrokinetic torque converter mechanism is designated generally by reference character 14. It is housed with in a torque converter bell housing 16. This bell housing can be connected to the housing of the gear system, not shown, suitable bolts being provided for this purpose. The outer periphery 20 of the bell housing 16 can be bolted to the engine block in a conventional fashion.

The torque converter 14 includes an impeller shell having two parts which are identified respectively by reference characters 22 and 24. The shell part 22 is formed with a generally toroidal shape and is welded at its hub to a mounting sleeve shaft 26. The shaft 26 is journaled within a bearing opening formed in a bearing retainer wall 28 which is bolted by bolts 30 to a wall 32. The wall 32 in turn is bolted to the flange 18 of housing 16.

The retainer wall can define a pump cavity within which are situated positive displacement pump elements, the power input element of which is keyed to the sleeve shaft 26. Thus a control pressure is made available whenever the engine is operated. This pressure is used as a supply source for filling the hydrokinetic torque converter unit and also as a control pressure source for the automatic control valve system for establishing the various speed ratios. A fluid seal 34 is situated between the sleeve shaft 26 and the surrounding opening formed in the wall 28.

Shell part 24 is formed with a flange that is bolted by means of bolts 36 to a cooperating flange formed on the periphery of the shell part 22. Shell part 24 extends radially inwardly and its hub 38 is received within a pilot opening formed in the end of the crankshaft 10. The outer periphery of the drive shell 24 can be secured by studs 40 to a crankshaft driven drive plate, not shown.

Impeller shell 22 has secured to its inner wall a plurality of impeller vanes or blades 42. The outer margin of the blades 42 can be secured to the inner margin of the shell part 22 in a suitable fashion such as by means of interlocking slots and projections. The inner margins of the blades 42 are secured to an inner impeller shell 44. The shell part 22, the shroud 44 and the blades 42 cooperate to define radial outflow passages.

A turbine 46 includes an outer shroud 48, an inner shroud 50 and turbine blades 52 situated between the shrouds and cooperating therewith to define radial inflow passages. The outer margins of the blades 52 can be formed with internal tabs and the shroud 48 can be formed with cooperating slots through which the tabs are received. Following assembly of the blades, the tabs are bent over as indicated at 54 to provide a permanent connection. The tabs 54 can be observed clearly in the front elevation view of FIGURE 2.

The hub 56 of the shroud 48 is secured to the turbine hub member 58. The sleeve shaft extension of the hub 58 is splined at 60 to the turbine shaft 12.

A stator 62 is provided with flow directing blades 64 situated between the flow exit region of the turbine 46 and the flow entrance region of the impeller blades 42. It includes a first shroud 66 and a second shroud 68. Shroud 68 forms a hub having a central opening 70 which receives an outer cammed race 72 for an overrunning brake assembly 74. The race 72 can be secured in place within the opening 70 by means of a sliding key connection or by splines. The cooperating inner race 76 for the brake assembly 74 is splined at 78 to a stator sleeve shaft 80.

Overrunning brake elements in the form of rollers 82 are situated between the races 72 and 74. They cooperate with cam surfaces in the race 72 thereby inhibiting rotary motion of the stator 62 in a direction opposite to the direction of rotation of the impeller while permitting freewheeling motion thereof in the opposite direction during coupling operation of the converter 14.

A spacer and thrust ring 84 is situated on one side of the overrunning brake 74 directly adjacent the hub of the converter impeller shell part 22. A cooperating thrust washer 86 provides a bearing surface for accommodating thrust forces on the stator.

Another spacer element 88 is situated between the hub 58 for the turbine and the overrunning brake 74. Element 88, which may be in the form of a ring, is held axially fast within the opening 70 by a snap ring as indicated. A corresponding snap ring also is provided for retaining the thrust ring 84 axially fast within the opening 70.

A clutch drive member 90 is situated between the turbine shroud 48 and the inwardly extending portion of the shell part 24. The outer peripheral surface of the clutch member 90 carries a friction disc 92 which is situated directly adjacent the friction surface 94 of the shell part 24.

The clutch member 90 is in the form of a plate or disc having a central opening through which the axial extension of hub 58 extends. Member 90 can be displaced axially with respect to the member 58. An annular seal, which may be in the form of an O-ring 96, provides a seal between the member 58 and the central opening of the member 90.

The cavity situated between the radially inward portion of the shell part 24 and the clutch member 90 is in fluid communication with a central opening 98 formed in the turbine shaft 12. This communication is established in part by radial slots 100 formed in the end of the extension of hub 58. A radial needle bearing thrust washer 102 is situated between the hub 38 of the shell part 24 and the end of the extension of hub 58.

A bushing 104 provides one bearing support for the shaft 12 which extends coaxially through the stator sleeve shaft 80. This sleeve shaft forms a part of a pump chamber enclosure member 106, which in turn is secured to the housing shown in part at 16.

The annular passage that is defined by the concentric shafts 80 and 12 is in fluid communication with radial passages 108, which in turn communicate with passage 90 by appropriately distributing pressure to the passages 108 through the annular passage surrounding shaft 12. The pressure in the cavity between shell part 24 and clutch member 90 can be controlled selectively. When this pressure is reduced to a value that is less than the pressure maintained in the torus circuit of the torque converter, the differential pressure produces a force that tends to apply the lockup clutch structure by shifting clutch member 90 so that friction surface 94 and disc 92 become frictionally engaged. Fluid is supplied to the torus circuit of the converter through an annular feed passage defined by the concentric sleeve shafts 80 and 26. The fluid may flow through this passage and through the space between the thrust element 84 and the thrust washer 86. It then may pass through the trailing edge portions of the shroud 68 of the stator 62 and the adjacent wall of the shell part 22.

Fluid is circulated continuously through the circuit. It is returned through a radial flow pasage that is defined by adjacent friction elements of the lockup clutch structure. The disc 92 is spaced relatively close to the surface 94 so that a fluid flow restriction is created when the fluid circulates through the system and is returned through passages 98 and 108. This creates a pressure drop. Because of this pressure drop, a pressure differential across the member 90 is created. As soon as the friction surfaces engage, circulation is interrupted. At that time, however, there is no slip between the impeller and turbine members since they are caused to rotate in unison by reason of the mechanical connection between them. Thus, there is no need for cooling the fluid in the torus circuit and for this reason no circulation is required.

During normal torque delivery operation with the lockup clutch structure disengaged, the fluid feed path may be defined by passages 108, 98 and the annular space between the member 90 and the shell part 24. The annular pasage between the sleeve shafts 80 and 26, on the other hand, can function as a flow return passage. Suitable valving structure can be provided for reversing the direction of the fluid flow to cause selective engagement and release of the lockup clutch structure.

The outer periphery of the member 90 is formed with a plurality of recesses identified by reference character 110. Each recess receives one end of a pair of cantilever springs that are shown in FIGURES 1 and 3 at 112 and 114. Each cantilever spring extends from a common support 116 which is secured to the other periphery of the turbine shroud 48 by means of rivets 118 and 120.

As best seen in FIGURE 3, the extended ends of the springs 112 and 114 are spaced from each other circumferentially.

The springs 112 and 114, after they are assembled, exert a preload that causes them to engage frictionally the radially outward margins of their associated slots in the lockup clutch member 90.

When the converter is in normal operation with the lockup clutch disengaged, no torque is applied to the clutch member 90. Thus the cantilever spring members 112 and 114 assume the position shown in FIGURE 3. As the clutch is applied, however, torque is distributed directly through the engaged friction surfaces of the clutch structure and through the cantilever spring members. This tends to cause the spring 114 to deflect toward spring 112. As this occurs the spring 112 will cause frictional resistance due to the slight relative movement between the periphery of the member 90 and the radially outward surface of the free end of the spring 112. The frictional resistance is augmented as the centrifugal force due to the rotating masses of the springs urges the springs against their companion friction surfaces. As the torque increases the gaps between the ends of the springs decrease. If the torque is excessive, the ends of the springs 112 and 114 engage each other thereby establishing a solid mechanical drive between the shell 24 and the turbine 46.

The friction between the surfaces of the spring 112 and the periphery of the member 90, as well as the spring force due to the deflection of the spring 114, creates a dampening action that eliminates shock loading in the driveline upon clutch application. If desired, a third spring similar to spring 114 can be provided on the opposite side of spring 112, and it may be located in a recess in the periphery of member 90 along with springs 112 and 114. Such an arrangement would permit a dampening action to occur if the clutch were to be engaged during torque delivery through the hydrokinetic unit in the reverse direction.

A plurality of recesses 110 can be provided in the member 90, and a corresponding number of cantilever springs 112 and 114 can be used. In a preferred embodiment of our invention, there are 26 slots and 26 springs 112 and 114. Such an arrangement is satisfactory for use in an automotive vehicle driveline having a medium displacement engine.

Having thus described a preferred form of our invention, what we claim and desire to secure by U.S. Letters Patent is:

1. In a torque delivery driveline for delivering torque from a driving member to a driven member arranged coaxially with respect to each other, a plurality of recesses formed in one of said members at a radially outward location with respect to the common axis, cantilever spring means secured to the other member and extending in a generally axial direction, the extended ends of said spring means being received within said recesses, and said spring means comprising a yieldable portion engageable with one side of said recesses upon torque delivery through said driveline, another portion of said spring means frictionally engaging said recesses, said other portion of said spring means being adapted to create frictional dampening forces upon deflection of said one portion of said spring means during fluctuations in the magnitude of the torque delivered through said driveline, said driveline including a hydrokinetic mechanism having an impeller and a turbine defining a torus and being situated in fluid flow relationship, a selectively engageable friction clutch having two engageable friction parts, said driven member carrying one friction part and being shiftable under the pressure in said torus into engagement with the other friction part, said turbine being rotatable with and connected to said driven member and said impeller carrying said other friction part.

2. In a torque delivery driveline for delivering torque from a driving member to a driven member arranged coaxially with respect to each other, a plurality of recesses formed in one of said members at a radially outward location with respect to the common axis, cantilever spring means secured to the other member and extending in a generally axial direction, the extended ends of said spring means being received within said recesses, said spring means comprising a yieldable portion engageable with one side of said recesses upon torque delivery through said driveline, another portion of said spring means frictionally engaging said recesses, said other portion of said spring means being adapted to create frictional dampening forces upon deflection of said one portion of said spring means upon a fluctuation in the magnitude of the torque delivered through said driveline, a hydrokinetic torque transfer mechanism comprising a fluid flow turbine and a fluid flow impeller situated in toroidal fluid flow relationship, a power input shaft, a power output shaft, said impeller being connected to said power input shaft, said turbine being connected to said power output shaft, and selectively engageable clutch means for connecting drivably said power input shaft to said driven member, said driven member forming a part of said turbine.

3. A hydrokinetic power transmission system comprising a bladed impeller and a bladed turbine situated in toroidal fluid flow relationship in a common torus circuit, a power input shaft drivably connected to said impeller, a power output shaft drivably connected to said turbine, and selectively engageable lockup clutch means for establishing a solid driving connection between said power input shaft and said power output shaft comprising a first clutch member that is adapted for axial displacement, said clutch member having formed thereon a first friction surface, a second cooperating friction surface carried by said impeller, and a cantilever spring means for establishing a resilient mechanical connection between said turbine and said clutch member, said cantilever spring means comprising recesses formed at a radially outward location in said clutch member and pairs of cantilever spring elements received within each recess, each pair of spring elements being connected to said turbine, one spring element being preloaded to establish a continuous frictional force upon said clutch member, the other spring element being adapted to engage one side of said recess and to deflect upon a variation in the magnitude of the torque transmitted from said power input shaft to said power output shaft, said one element establishing a friction dampening force upon deflection of the other spring element, said frictional force and the spring force of said other spring element being adapted to dampen torsional vibrations in said mechanism upon application of said lockup clutch means.

4. A hydrokinetic power transmission system comprising a bladed impeller and a bladed turbine situated in toroidal fluid flow relationship in a common torus circuit, a power input shaft drivably connected to said impeller, a power output shaft drivably connected to said turbine, and selectively engageable lockup clutch means for establishing a solid driving connection between said power input shaft and said power output shaft comprising a first clutch member that is adapted for axial displacement, said clutch member having formed thereon a first friction surface, a second cooperating friction surface carried by said impeller, and a cantilever spring means for establishing a resilient mechanical connection between said turbine and said clutch member, said cantilever spring means comprising recesses formed at a radially outward location in said clutch member, pairs of cantilever spring elements received within each recess, each pair of spring elements being connected to said turbine, one spring element being preloaded to establish a continuous frictional force upon said clutch member, the other spring element being adapted to engage one side of said recess and to deflect upon a variation in the magnitude of the torque transmitted from said power input shaft to said power output shaft, said one element establishing a friction dampening force upon deflection of the other spring element, said frictional force and the spring force of said other spring element being adapted to dampen torsional vibrations in said mechanism upon application of said lockup clutch means, said clutch member being in the form of a plate, said impeller including an impeller shell that encloses the turbine and said plate, said second friction surface being formed on said shell, said shell and said plate cooperating to define a pressure cavity, and means for supplying fluid through said cavity to said circuit, said cavity functioning as a radial outflow passage, flow return passage means for accommodating return flow of fluid circulated through said circuit, said flow return passage means being independent of said fluid supply passage means, a reversal in the direction of the toroidal fluid flow through said circuit being accompanied by a pressure differential across said plate whereby it is urged into frictional engagement with said second friction surface to establish a direct driving connection between said power input shaft and said turbine.

5. A hydrokinetic power transmission system comprising a bladed impeller and a bladed turbine situated in toroidal fluid flow relationship in a common torus circuit, a power input shaft drivably connected to said impeller, a power output shaft drivably connected to said turbine, and selectively engageable lockup clutch means for establishing a solid driving connection between said power input shaft and said power output shaft comprising a first clutch member that is adapted for axial displacement, said clutch member having formed thereon a first friction surface, a second cooperating friction surface carried by said impeller, and a cantilever spring means for establishing a resilient mechanical connection between said turbine and said clutch member, said cantilever spring means comprising recesses formed at a radially outward location in said clutch member, pairs of cantilever spring elements received within each recess, each pair of spring elements being connected to said turbine, one spring element being preloaded to establish a continuous frictional force upon said clutch member, the other spring element being adapted to engage one side of said recess and to deflect upon a variation in the magnitude of the torque transmitted from said power input shaft to said power output shaft, said one element establishing a friction dampening force upon deflection of the other spring element, said frictional force and the spring force of said other spring element being adapted to dampen torsional vibrations in said mechanism upon application of said lockup clutch means, said hydrokinetic torque transmitting mechanism comprising also a bladed stator situated between the flow exit region of said turbine and the flow entrance region of said impeller, said stator being adapted to change the direction of the tangential fluid flow velocity vectors at a radially inward region of said circuit, and one-way brake means for inhibiting rotation of said stator in the direction of rotation of said impeller while accommodating freewheeling motion thereof in the opposite direction.

6. A hydrokinetic power transmission system comprising a bladed impeller and a bladed turbine situated in toroidal fluid flow relationship in a common torus circuit, a power input shaft drivably connected to said impeller, a power output shaft drivably connected to said turbine, and selectively engageable lockup clutch means for establishing a solid driving connection between said power input shaft and said power output shaft comprising a first clutch member that is adapted for axial displacement, said clutch member having formed thereon a first friction surface, a second cooperating friction surface carried by said impeller, and a cantilever spring means for establishing a resilient mechanical connection between said turbine and said clutch member, said cantilever spring means comprising recesses formed at a radially outward location in said clutch member, pairs of cantilever spring elements received within each recess, each pair of spring elements being connected to said turbine, one spring element being preloaded to establish a continuous frictional force upon said clutch member, the other spring element being adapted to engage one side of said recess and to deflect upon a variation in the mangitude of the torque transmitted from said power input shaft to said power output shaft, said one element establishing a friction dampening force upon deflection of the other spring element, said frictional force and the spring force of said other spring element being adapted to dampen torsional vibrations in said mechanism upon application of said lockup clutch means, said clutch member being in the form of a plate, said impeller including an impeller shell that encloses the turbine and said plate, said second friction surface being formed on said shell, said shell and said plate cooperating to define a pressure cavity, means for supplying fluid through said cavity to said circuit, said cavity functioning as a radial outflow passage, flow return passage means for accommodating return flow of fluid circulated through said circuit, said flow return passage means being independent of said fluid supply passage means, a reversal in the direction of the toroidal fluid flow through said circuit being accompanied by a pressure differential across said plate whereby it is urged into frictional engagement with said second friction surface to establish a direct driving connection between said power input shaft and said turbine, said hydrokinetic torque transmitting mechanism comprising also a bladed stator situated between the flow exit region of said turbine and the flow entrance region of said impeller, said stator being adapted to change the direction of the tangential fluid flow velocity vectors at a radially inward region of said circuit, and one-way brake means for inhibiting rotation of said stator in the direction of rotation of said impeller while accommodating freewheeling motion thereof in the opposite direction.

References Cited by the Examiner
UNITED STATES PATENTS

| 2,992,713 | 7/1961 | Stump et al. | 192—3.2 |
| 3,184,019 | 5/1965 | Brise | 192—3.2 |

FOREIGN PATENTS

| 203,378 | 9/1923 | Great Britain. |
| 561,192 | 5/1944 | Great Britain. |
| 161,124 | 6/1933 | Switzerland. |

DAVID J. WILLIAMOWSKY, *Primary Examiner.*

BENJAMIN W. WYCHE III, *Examiner.*